US011379616B2

(12) United States Patent
Levy et al.

(10) Patent No.: US 11,379,616 B2
(45) Date of Patent: Jul. 5, 2022

(54) SYSTEM AND METHOD FOR PROVIDING ANONYMOUS VALIDATION OF A QUERY AMONG A PLURALITY OF NODES IN A NETWORK

(71) Applicant: Identiq Protocol Ltd., Tel Aviv (IL)

(72) Inventors: Itay Levy, Tel Aviv (IL); Uri Arad, Herzliya (IL)

(73) Assignee: IDENTIQ PROTOCOL LTD., Tel Aviv (IL)

( * ) Notice: Subject to any disclaimer, the term of this patent is extended or adjusted under 35 U.S.C. 154(b) by 78 days.

(21) Appl. No.: 16/826,638

(22) Filed: Mar. 23, 2020

(65) Prior Publication Data

US 2020/0311307 A1 Oct. 1, 2020

Related U.S. Application Data

(60) Provisional application No. 62/823,028, filed on Mar. 25, 2019.

(51) Int. Cl.
*H04L 9/08* (2006.01)
*H04L 9/32* (2006.01)
*G06F 21/62* (2013.01)

(52) U.S. Cl.
CPC .......... *G06F 21/6254* (2013.01); *H04L 9/085* (2013.01); *H04L 9/0866* (2013.01)

(58) Field of Classification Search
CPC .... G06F 21/6254; H04L 9/085; H04L 9/0866
See application file for complete search history.

(56) References Cited

U.S. PATENT DOCUMENTS

| | | | | |
|---|---|---|---|---|
| 2014/0222690 | A1* | 8/2014 | Wilf | G06F 21/33 705/44 |
| 2014/0304398 | A1 | 10/2014 | Carlen et al. | |
| 2015/0195144 | A1* | 7/2015 | Vasseur | G06N 99/00 709/204 |
| 2015/0332283 | A1* | 11/2015 | Witchey | G06Q 10/10 705/3 |
| 2018/0032526 | A1* | 2/2018 | Cudak | H04L 63/123 |
| 2018/0349627 | A1* | 12/2018 | Kaushik | G06F 21/6227 |

(Continued)

OTHER PUBLICATIONS

PCT Search Report from Appl. No. PCT/IL20/50344 dated Aug. 7, 2020.

*Primary Examiner* — Darshan I Dhruv

(74) *Attorney, Agent, or Firm* — Pearl Cohen Zedek Latzer Baratz LLP

(57) ABSTRACT

A system and method for providing anonymous validation of a query among a plurality of nodes in a network: receives at a support node a query from a requester node; wherein the query comprises a one-way function representation of at least one data point of information of the requester node; receives at the support server, from at least one validator node, a one-way function representation of at least one data point of information of the validator node; compares by the support server the query from the requestor node with the one-way function representation of the at least one data point of information; determines by an aggregator server, based on the comparison, whether the at least one data point of information of the requester node matches the at least one data point of information of the at least one validator node; and outputs a match result to the requestor node.

24 Claims, 5 Drawing Sheets

(56) References Cited

U.S. PATENT DOCUMENTS

| | | | |
|---|---|---|---|
| 2019/0087835 A1* | 3/2019 | Schwed | G06F 21/6218 |
| 2019/0342083 A1* | 11/2019 | LeSaint | H04L 9/14 |
| 2019/0377832 A1* | 12/2019 | McLean | H04L 63/20 |
| 2020/0134199 A1* | 4/2020 | Conway | G06F 21/602 |
| 2020/0272760 A1* | 8/2020 | Kurian | G06F 21/6254 |
| 2020/0274878 A1* | 8/2020 | Kurian | H04L 63/0861 |
| 2020/0287874 A1* | 9/2020 | Bertram | H04L 9/321 |

* cited by examiner

SYSTEM AND METHOD FOR PROVIDING ANONYMOUS VALIDATION OF A QUERY AMONG A PLURALITY OF NODES IN A NETWORK

CROSS REFERENCE TO RELATED APPLICATIONS

This application claims priority from U.S. Provisional Application No. 62/823,028, filed on Mar. 25, 2019, which is incorporated herein by reference in its entirety.

FIELD OF THE INVENTION

The present invention is in the field of data validation. In particular, the present invention is directed to providing anonymous validation of a query among a plurality of nodes in a network.

BACKGROUND OF THE INVENTION

Online businesses face a serious challenge in today's world as they try to balance the need for robust fraud prevention with the need to provide consumers with a fast, seamless, and user-friendly experience. This challenge is emphasized when management of this risk requires the use of Personally Identifiable Information (PII) data. PII data, as understood herein, may refer to information that can be used to distinguish or trace an individual's identity, directly or when combined with other datasets, either alone or when combined with other personal or identifying information that is linked or linkable to a specific individual. This data is highly sensitive, and therefore is frequently incomplete. As a result, when businesses lack data they may incorrectly classify legitimate customers as too risky, leading to loss of business and potentially alienating customers. In other cases, businesses may fall victim to fraudsters who generate synthetic identities or use stolen identities and who leverage the lack of simple methods to tell a real identity from a synthetic one without high cost or friction, resulting in high losses to the business, even if the same identity has already been flagged as bad by other online services. In both cases, businesses are faced with the challenge of validating the customer's identity without inflicting high-friction.

This problem further extends beyond identity verification to other sensitive or personally identifiable assets, such as credit card numbers, bank accounts, IP addresses, email addresses, etc. Moreover, as some of these assets are likely to change throughout the customer's lifetime, businesses require a mechanism that provides frequently-updated customer records. A particular challenge is linking these assets to a specific person or owner, for example, knowing whether someone making a payment is the owner of the credit card provided.

A potential solution to this challenge is for online businesses to share data about their trusted customers, with each other, allowing for better risk management, faster growth of business, and providing customers with a superior user experience. While all online businesses could benefit from having access to more data and ideally share the data with others, they are currently faced with several challenges, hindering this type of collaboration:

Privacy—both regulation (e.g., GDPR 2018, US Privacy Act 1974, California Consumer Protection Act (CCPA), etc.) and public opinion demand that online businesses be committed to protecting the privacy and security of data. As a result, online businesses are reluctant, and often prohibited to share data, or export data outside of their controlled data warehouses. Data sharing is allowed only in specific cases such as criminal investigation and confirmed fraud, and even in these cases, online businesses are very careful with regards to whom they share the data with. When sharing data, these businesses may be held liable as to the security means and policies of the third party as well as the use of the shared data. For example, Facebook® was fined $5 Billion and was also held responsible in the public eye for its role in the infamous Cambridge Analytica data breach.

Collaboration vs. Competition—data is considered to be the "new oil" for businesses, and is a competitive advantage of a company. Therefore, companies prefer not sharing data directly with each other, and would like to stay in full control of their own data. However, when the potential business benefit is high, companies will agree to share data with other companies, and competitors, usually through a trusted third party, which also provides anonymity to the source of the data, therefore some trade secrets may be kept (e.g., sharing blacklisted credit-cards).

Current solutions to the identity data validation problem may be classified as one of the following categories:

Data Brokers—Companies who collect and aggregate data from online sources and/or buy data from companies who own the customer relationship. This data is later sold to other companies who use the data for their decision processes.

Specialized Data Vendors—Companies which aggregate and distribute specific data sets, usually offering some data quality verification and hygiene on top of raw data, as well as some risk scoring for each asset. Some common examples include: Emailage for email addresses, MaxMind and Digital Resolve for IP-Geolocation data, Neustar for Phone related information Data Bureaus—Organizations that operate under a government license to hold consumer private data. In most cases created to support credit applications by collecting reported data and providing a calculated credit score (e.g., Experian, FICO, Equifax, TransUnion, Innovis, PRBC, etc.)

Data Marketplaces—bring together data vendors and data consumers. The marketplaces typically focus on simplifying access to data and integration but provide no added value.

Fraud Management Tools—tools which use data from multiple companies to risk score accounts or transactions.

While existing solutions have been in use for many years, they all share some intrinsic drawbacks, which limit their effectiveness and viability in the market:

Fragmentation/Coverage—due to the nature of PII data, most solutions only provide data in specific countries or geographies. Global businesses have to locate and integrate many vendors to achieve high coverage and accuracy.

Reliability and Lineage—most data vendors and aggregators provide limited or no information about how the data was collected and whether proper permission was gathered from the data subjects. This may lead to an unintended breach of privacy or break in consumer trust, for example, as well as result in higher fraud losses in cases where data is not accurate or reliable.

Privacy Exposure—existing solutions require a data exchange between a requester and the validation service provider. This exchange may result in exposure of private data and a potential breach in customer privacy. Analyzing a common data exchange will show:

Requester (of data)—While companies typically have a legitimate reason to share data with vendors for verification purposes, they have no control over how the vendor uses the data. This may lead to vendors collecting and using data beyond the original purpose for which it was collected. This puts further liability on the requester, and may result in privacy infringement.

Provider (of data)—Approved companies, businesses, or services that are authorized by users willingly or sometimes unknowingly to access their personal profiles, are often the source of PII data collected, e.g., data brokers. Similarly, online users are often asked to provide PII in order to register an account on a website. The website will then inform users about data gathering and benefits of storing the data, such as there being no need to enter the password every time and more effective on personal advertisements. However, these approved companies may sell the PII they have collected and stored to data brokers, most often without users' knowledge or consent. Companies are often unable to confirm whether or not the data they are now receiving was acquired with the required user permission.

Regulatory Issue—Independent Sources—regulation may require some data elements to be validated by multiple independent sources. However, since the source of the actual data is unknown, a company may be validating the data against two different third-party vendors, but, in fact, if both of them are buying the data from the same source, are only validating the data from one source.

Single point of failure—as the value of data increases, so does the dependence on this data. Businesses are becoming increasingly concerned about being dependent on a single source, which may discontinue service at any time leaving the business unable to complete critical business processes successfully.

What is needed, therefore, is a solution such that users can validate sensitive and private information about a person, a payment instrument, or a company, using data from another user, without compromising the underlying privacy of Personally Identifiable Information (PII).

SUMMARY OF EMBODIMENTS OF THE INVENTION

An embodiment of the invention includes a method for providing anonymous validation of a query among a plurality of nodes in a network includes: receiving at a first server a query from a requester node in the network, for validation of the query by at least one other node of the plurality of nodes; in which the query comprises an encoded representation of at least one data point of information of the requester node; and in which the encoded representation is divided into a first set of multiple shares; receiving at the first server, from at least one validator node of the plurality of nodes, an encoded representation of at least one data point of information of the validator node; in which the encoded representation from the at least one validator node is divided into a second set of multiple shares; comparing by a plurality of support servers the first set of multiple shares from the requestor node with the second set of multiple shares of the at least one validator node; determining by a second server, based on the comparison, whether or not the at least one data point of information of the requester node matches the at least one data point of information of the at least one validator node; and outputting a match result to the requestor node.

In some embodiments, the encoded representation comprises a one-time encryption and the one-time encryption is used by the requestor node and the at least one validator node. In some embodiments, the first and second sets of multiple shares are randomly generated for each node respectively. In some embodiments, the comparing step further includes: sending each share of the first set of multiple shares to a separate support server from the other shares of its set; sending each share of the second set of multiple shares to a separate support server from the other shares of its set; and at each support server, reconciling a value received from the requester node against an equivalent value received from the at least one validator node.

In some embodiments, the determining step further includes: aggregating, by the second server, a set of resulting values from each of the plurality of support servers; consolidating the sets of resulting values from the plurality of support servers; and identifying, based on the consolidating, whether or not a sum equaling zero results. In some embodiments, the at least one data field relates to an identity of a customer. In some embodiments, the network is a closed network, and wherein each node in the closed network is a preapproved member of the closed network.

In some embodiments, each of the plurality of support servers comprises an ephemeral node and wherein the ephemeral node includes no persistent memory or storage capacity. Some embodiments of the invention further include: calculating, by the second server, a confidence score associated and with the match result; and outputting the confidence score with the match result.

A further method for providing anonymous validation of a query among a plurality of nodes in a network includes: receiving at a support node in the network a query from a requester node in the network; in which the query comprises a one-way function representation of at least one data point of information of the requester node; receiving at the support server, from at least one validator node of the plurality of nodes, a one-way function representation of at least one data point of information of the validator node; comparing by the support server the query from the requestor node with the one-way function representation of the at least one data point of information of the at least one validator node; determining by an aggregator server, based on the comparison, whether or not the at least one data point of information of the requester node matches the at least one data point of information of the at least one validator node; and outputting a match result to the requestor node.

Systems according to embodiments of the above methods may be provided. These and other aspects, features and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
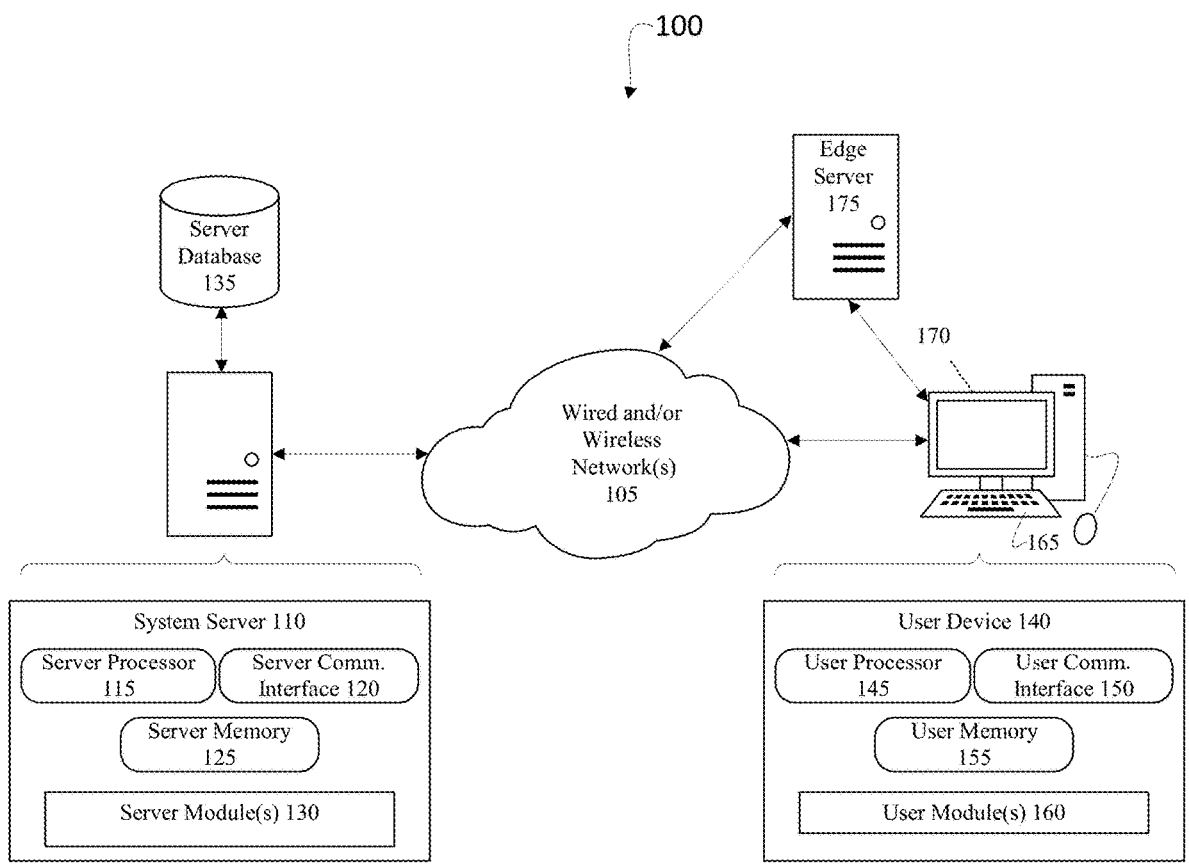
FIG. 1 shows a high-level diagram illustrating an example configuration of a system 100 for providing anonymous validation of a query among a plurality of nodes in a network, according to at least one embodiment of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

In some embodiments of the invention a new approach to data validation is provided, allowing businesses to validate each-other's data (e.g., sensitive and private information about a person, a payment instrument, a company, etc.) while keeping control of their own data, and protecting their customers' privacy. To achieve this, in some embodiments of the invention, a decentralized peer-to-peer private data validation network is established in which each participating member, e.g., a company, individual, etc., (hereinafter: "requesting party", "requesting member", or "requestor") is able to validate the data they receive from a consumer against the full knowledge of the network. As a decentralized framework, all data is kept at its origin, and no personal data is shared, copied or duplicated with any third-party as part of the validation exchange, including to the identity of the originating and validating parties. Data validation may be performed in a secure and private manner, where each data element is fully anonymized, such that no party is ever exposed to any PII data other than their own. The requesting party receives proof that the full set of data received from the consumer is valid, while no other party, including the network operator, learns anything about the identity of the consumer whom the requestor inquired about. In addition, no other participating member can learn the identity of the requestor, or even that a valid match was found.

Being part of the data validation network, each network member is provided with the ability to support validation data queries coming from other participating members as well as make requests to the network, thus constantly expanding the universe of data available to the network as a whole.

This new paradigm allows member organizations to better mitigate the risk and exposure to identity fraud and significantly reduce false positive ratios, while meeting or exceeding privacy and regulatory requirements. Members of the network take part in computation and data validation and, in some embodiments, for positive matches may collect a reward.

FIG. 1 shows a high-level diagram illustrating an example configuration of a system 100 for providing anonymous validation of a query among a plurality of nodes in a network, according to at least one embodiment of the invention. System 100 includes network 105, which may include a private operational network, the Internet, one or more telephony networks, one or more network segments including local area networks (LAN) and wide area networks (WAN), one or more wireless networks, or a combination thereof. In some embodiments, system 100 may include a system server 110 constructed in accordance with one or more embodiments of the invention. In some embodiments, system server 110 may be a stand-alone computer system. In other embodiments, system server 110 may include a decentralized network of operatively connected computing devices, which communicate over network 105. Therefore, system server 110 may include multiple other processing machines such as computers, and more specifically, stationary devices, mobile devices, terminals, and/or computer servers (collectively, "computing devices"). Communication with these computing devices may be, for example, direct or indirect through further machines that are accessible to the network 105.

System server 110 may be any suitable computing device and/or data processing apparatus capable of communicating with computing devices, other remote devices or computing networks, receiving, transmitting and storing electronic information and processing requests as further described herein. System server 110 is therefore intended to represent various forms of digital computers, such as laptops, desktops, workstations, personal digital assistants, servers, blade servers, edger servers, mainframes, and other appropriate computers and/or networked or cloud-based computing systems capable of employing the systems and methods described herein.

In some embodiments, system server 110 may include a server processor 115 which is operatively connected to various hardware and software components that serve to enable operation of the system 100. Server processor 115 may serve to execute instructions to perform various operations relating to various functions of embodiments of the invention as described in greater detail herein. Server processor 115 may be one or a number of processors, a central processing unit (CPU), a graphics processing unit (GPU), a multi-processor core, or any other type of processor, depending on the particular implementation.

System server 110 may be configured to communicate via communication interface 120 with various other devices connected to network 105. For example, communication interface 120 may include but is not limited to, a modem, a Network Interface Card (NIC), an integrated network interface, a radio frequency transmitter/receiver (e.g., Bluetooth wireless connection, cellular, Near-Field Communication (NFC) protocol, a satellite communication transmitter/receiver, an infrared port, a USB connection, and/or any other such interfaces for connecting the system server 110 to other computing devices and/or communication networks such as private networks and the Internet.

In certain implementations, a server memory 125 may be accessible by server processor 115, thereby enabling server processor 115 to receive and execute instructions such a code, stored in the memory and/or storage in the form of one or more software modules 130, each module representing one or more code sets. The software modules 130 may include one or more software programs or applications (collectively referred to as the "server application") having computer program code or a set of instructions executed partially or entirely in server processor 115 for carrying out operations for aspects of the systems and methods disclosed herein, and may be written in any combination of one or more programming languages. Server processor 115 may be configured to carry out embodiments of the present invention by, for example, executing code or software, and may execute the functionality of the modules as described herein. Exemplary software modules may include a communication module, and other modules as described herein. The communication module may be executed by server processor 115 to facilitate communication between system server 110 and the various software and hardware components of system 100, such as, for example, server database 135, user device(s) 140, and/or edge server(s) 175 as described herein.

Of course, in some embodiments, server modules 130 may include more or less actual modules which may be executed to enable these and other functionalities of the invention. The modules described herein are therefore intended to be representative of the various functionalities of system server 110 in accordance with some embodiments of the invention. It should be noted that in accordance with various embodiments of the invention, server modules 130 may be executed entirely on system server 110 as a stand-alone software package, partly on system server 110 and partly on one or more of user device 140 and edge server 175, or entirely on user device 140 and/or edge server 175.

Server memory 125 may be, for example, a random access memory (RAM) or any other suitable volatile or non-volatile computer readable storage medium. Server memory 125 may also include storage which may take various forms, depending on the particular implementation. For example, the storage may contain one or more components or devices such as a hard drive, a flash memory, a rewritable optical disk, a rewritable magnetic tape, or some combination of the above. In addition, the memory and/or storage may be fixed or removable. In addition, memory and/or storage may be local to the system server 110 or located remotely.

In accordance with further embodiments of the invention, system server 110 may be connected to one or more database(s) 135, for example, directly or remotely via network 105. Database 135 may include any of the memory configurations as described herein, and may be in direct or indirect communication with system server 110. In some embodiments, database 135 may store information related to one or more aspects of the invention.

As described herein, among the computing devices on or connected to the network 105 may be one or more user devices 140. User device 10 may be any standard computing device. As understood herein, in accordance with one or more embodiments, a computing device may be a stationary computing device, such as a desktop computer, kiosk and/or other machine, each of which generally has one or more processors, such as user processor 145, configured to execute code to implement a variety of functions, a computer-readable memory, such as user memory 155, a user communication interface 150, for connecting to the network 105, one or more user modules, such as user module 160, one or more input devices, such as input devices 165, and one or more output devices, such as output devices 170. Typical input devices, such as, for example, input devices 165, may include a keyboard, pointing device (e.g., mouse or digitized stylus), a web-camera, and/or a touch-sensitive display, etc. Typical output devices, such as, for example output device 170 may include one or more of a monitor, display, speaker, printer, etc.

In some embodiments, user module 160 may be executed by user processor 145 to provide the various functionalities of user device 140. In particular, in some embodiments, user module 160 may provide a user interface with which a user of user device 140 may interact, to, among other things, communicate with system server 110

Additionally or alternatively, a computing device may be a mobile electronic device ("MED"), which is generally understood in the art as having hardware components as in the stationary device described above, and being capable of embodying the systems and/or methods described herein, but which may further include componentry such as wireless communications circuitry, gyroscopes, inertia detection circuits, geolocation circuitry, touch sensitivity, among other sensors. Non-limiting examples of typical MEDs are smartphones, personal digital assistants, tablet computers, and the like, which may communicate over cellular and/or Wi-Fi networks or using a Bluetooth or other communication protocol. Typical input devices associated with conventional MEDs include, keyboards, microphones, accelerometers, touch screens, light meters, digital cameras, and the input jacks that enable attachment of further devices, etc.

In some embodiments, user device 140 may be a "dummy" terminal, by which processing and computing may be performed on system server 110, and information may then be provided to user device 140 via server communication interface 120 for display and/or basic data manipulation. In some embodiments, modules depicted as existing on and/or executing on one device may additionally or alternatively exist on and/or execute on another device. For example, in some embodiments, one or more modules of server module 130, which is depicted in FIG. 1 as existing and executing on system server 110, may additionally or alternatively exist and/or execute on user device 140. Likewise, in some embodiments, one or more modules of user module 160, which is depicted in FIG. 1 as existing and executing on user device 140, may additionally or alternatively exist and/or execute on system server 110.

Likewise, in some embodiments, edge server 175 may be a "dummy" terminal, by which processing and computing may be performed on user device 140, and information may then be provided to edge server 175 via user communication interface 150 for display and/or basic data manipulation. In some embodiments, modules depicted as existing on and/or executing on one device may additionally or alternatively exist on and/or execute on another device. For example, in some embodiments, one or more modules of user module 160, which is depicted in FIG. 1 as existing and executing on user device 140, may additionally or alternatively exist and/or execute on edge server 175. In some embodiments, edge server 175 may include one or more features and/or functionalities as described in FIG. 1 with relation to system server 110 and/or user device 140.

Figure 2:
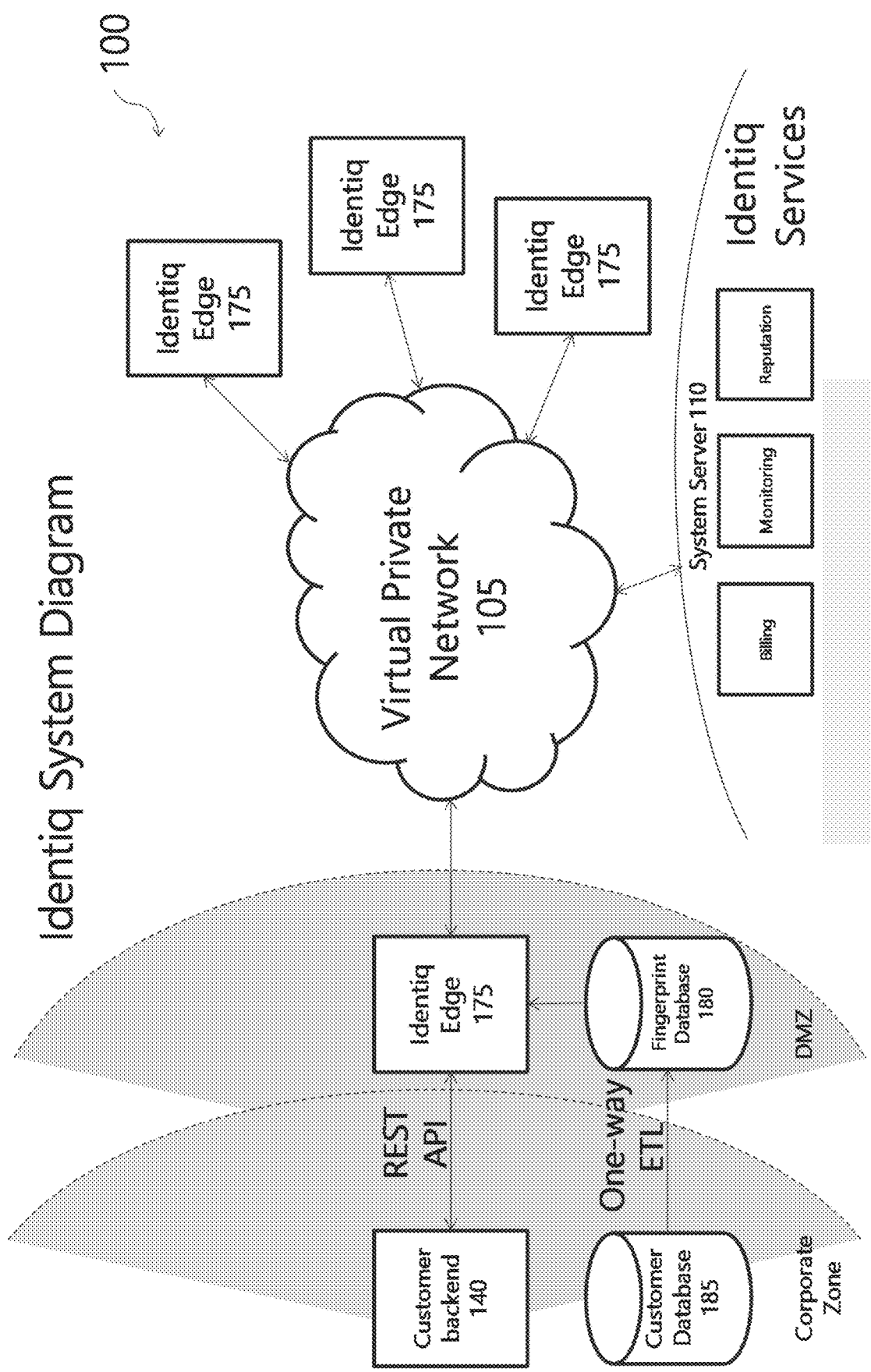
FIG. 2 shows a high-level system architecture overview of an example configuration of system 100.

FIG. 2 shows a high-level system architecture overview of an example configuration of system 100 (see FIG. 1) for providing anonymous validation of a query among a plurality of nodes in a network, according to at least one embodiment of the invention.

In some embodiments, a private network 105 as depicted in the center may hold some or all of the services and/or functionalities described herein. In some embodiments, some or all of the services and/or functionalities described herein may be hosted, e.g., on system server 110 and/or distributed across various edge servers 175 and/or user devices 140 (also referred to as the "customer backend"). In some embodiments, edge server 175 may be installed at the premises of a customer/member/user, e.g., on their cloud environment or at the member's data center.

In some embodiments, private network 105 may be a closed network in which each member goes through e.g., a vetting process and only then can be authorized to deploy the Edge and connect to the closed network. By convention, each edge server 175 is referred to herein as a "node" on the network 105.

In some embodiments, edge server 175 may facilitate customers being able to send a query to the network and receive a response (i.e., a "verification"). In some embodiments, each edge server 175 may contain, e.g., an encoded (e.g., hashed) version of the customer's client base so the customer may vouch for their own customer base in a given response. Encoding as understood herein may be a one-way mapping or other representative form of the original data, which may be implemented, for example using Hash, Encryption, or other means.

In some embodiments, each customer uploads their data to a provided/installed software development kit (SDK) to ensure the proper encoding and/or representation of the data (e.g., hashing, one-way mapping, and/or other encryption), which may then be stored on edge server 175 and/or in fingerprint database 180 without any PII and/or raw data being stored on edge server 175 or in fingerprint database 180. In some embodiments, encoding and/or representation of the data may further include data cleanup and/or normalization described herein. The PII and/or raw data may be kept, e.g., behind a firewall in the user's database, e.g., customer database 185. In some embodiments, edge server 175 and/or fingerprint database 180 may be provided in a demilitarized zone (DMZ), while customer backend 140 and/or customer database 185 may be provided, e.g., in a corporate zone where protection is the highest. In computer security, a DMZ (sometimes referred to as a perimeter network or screened subnet) is a physical or logical subnetwork that may contain and/or expose an organization's external-facing services to an untrusted network or untrusted elements within an otherwise trusted network.

In accordance with various embodiments of the invention there may be, e.g., three tiers of data:

Customer's data (e.g., CRM, etc.)—raw PII data which is stored on the customer's system. This data in its original format is stored at the customer secure zone and is not exposed to edge server 175 or network 105. It is, however, the source data for the edge server 175.

Fingerprint Database contains the customer data after it has been processed, e.g., by the SDK. In some embodiments, the SDK processes the data, runs cleansing, normalization, and/or hashing of the data such that, in some embodiments, the fingerprint database 180 may hold only a an encoded, e.g., one-way hashed version or otherwise irreversible, non-identifying, representation of the data. As noted herein, this database is still under the security control of the customer.

In some embodiments as described herein, when a verification request is issued to the other nodes in the closed network, the request may go through a second layer of one-way mapping or encoding (e.g., based on one or more protocols such as hashing, etc.) and eventually the request itself may contain a sequence of random numbers (and not the fingerprint encoded version of the data as stored on fingerprint database 180). Importantly, consumer-related data, even in its encoded form, is not stored anywhere on network 105 (or any other nodes connected thereto). The only place in which data is stored is at the relevant customer edge server 175.

Privacy is a key consideration of the system and methods described herein. Accordingly, a substantial improvement to prior art systems and a key aspect of the architecture and design of embodiments of the invention is a set of tools that enables protection of the data flow and assurance that the identity of the network members participating in a request execution is hidden, both from the requestor side as well as from the side of the vouchers (validators). Furthermore, the systems and methods as described herein ensures that the identity of the end consumers is protected, as well as their data (including ensuring that PII data cannot be compromised).

Figure 3:
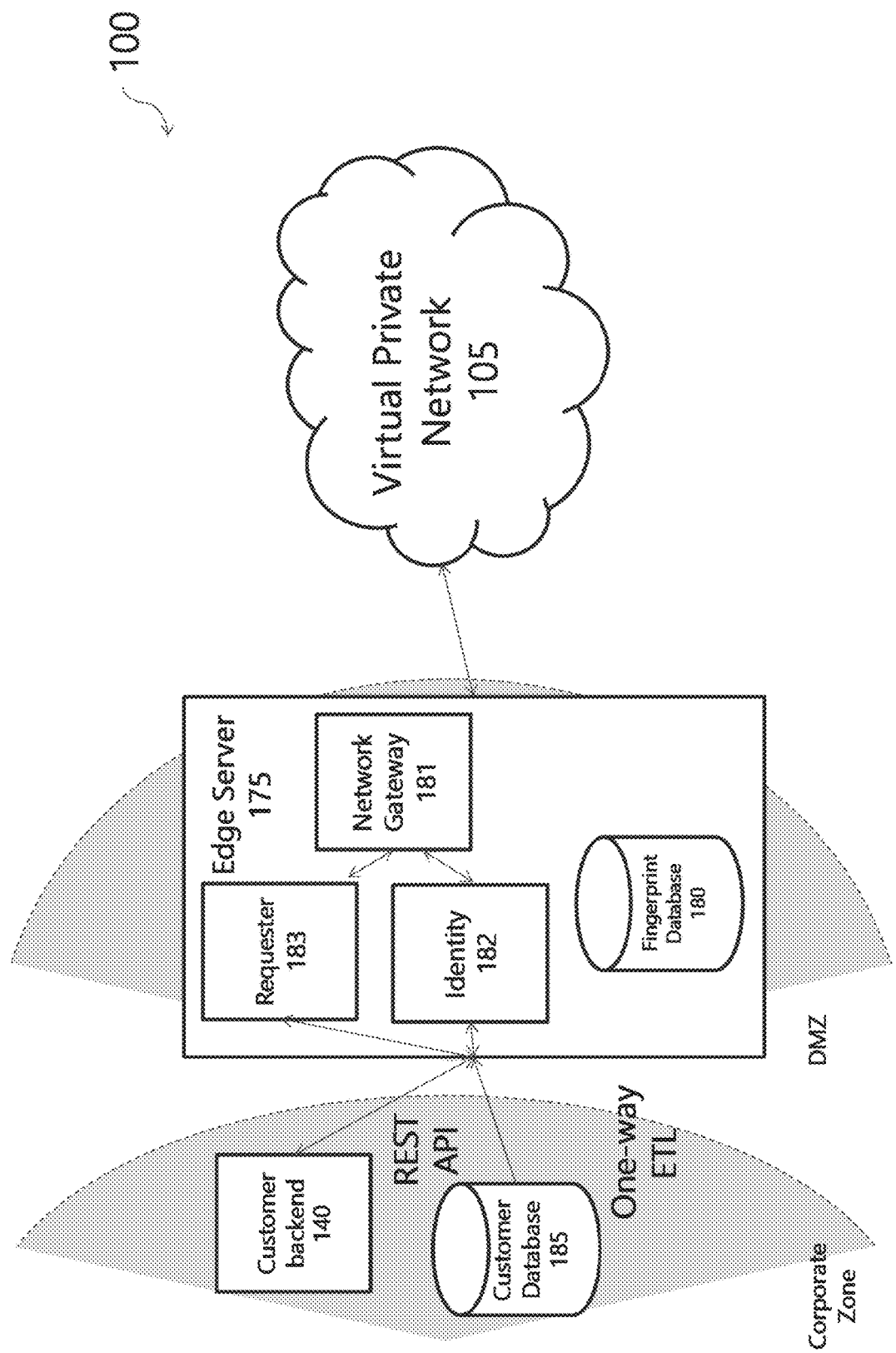
FIG. 3 shows a high-level example configuration of the edge server 175 of system 100 (see FIG. 1 and FIG. 2), according to at least one embodiment of the invention.

FIG. 3 shows a high-level example configuration of the edge server 175 of system 100 (see FIG. 1 and FIG. 2), according to at least one embodiment of the invention.

In some embodiments, edge server 175 may provide one or more privacy features:

1. "No PII at the Edge"—
   a. In some embodiments, the SDK may ensure that all data loaded to the edge server 175 is cleansed, encoded, hashed, and/or anonymized, thereby ensuring the edge server 175 cannot contain any PII and/or raw data.
   b. In some embodiments, an edge server data-loading application programming interface (API) may be provided which may contain a filter, e.g., to ensure that someone on the customer side does not (accidentally) load non-encoded data into edge server 175 (e.g., in case the SDK is not been used or is not operational).

2. "Network Level Authentication"—In some embodiments, edge server 175 may connect only to the private network 105, e.g., via a component called a Network Gateway, e.g., edge network gateway 181. By using a client-side certificate (TLS), for example, edge server 175 may authorize network 105 to connect to it, and the Edge Network Gateway 181 may verify edge server 175 can connect only to the network 105.

3. "Network Isolation"—In some embodiments, edge server 175 may be configured to connect only to the network 105, and, in further embodiments, when connected, edge server 175 may see only the services provided by the network 105 and not the other edge servers (e.g., nodes representing different customers). In some embodiments, this may be implemented using a virtual LAN.

In some embodiments, network 105 (also referred to herein as a "cloud") may provide various privacy features to edge servers 175:

1. "Network Level Authentication"—In some embodiments, each edge server 175 may connect to network 105 via a service called a Cloud API Gateway 181. This service may be resident on the network side and may validate each edge server 175 and ensure the edge server 175 can connect to the network. In some embodiments, this may be implemented by using, e.g., a client-side certificate or other identity 182. In some embodiments, an alternative authentication method such as, e.g., credentials and/or multi-factor authentication may be implemented.

2. "Member Authentication"—In some embodiments, a Request Generator service (e.g., Requester 183) may authenticate the incoming request and generate a unique request ID for each query. In some embodiments, this request ID exists only during the request life cycle and is deleted afterward (e.g., automatically or manually). In some embodiments, the Generator may validate the Request origin and block any attempt for system abuse.

3. "Request Signing"—In some embodiments, the Request generator may sign the request, ensuring that no one can temper with the request information, and/or inject unauthorized requests to the network.

4. "Casting Network Identities"—In some embodiments, a Network Assigner may provide the participant member nodes for each query, in accordance with one or more system protocols. These party nodes may include participating edge servers 175 (e.g., as vouchers/validators), a Computation service, Aggregator service, and/or Scoring service (all described herein). In some embodiments, for each request, the Network Assigner may generate ad-hoc IDs for these services so the Requestor edge server 175 (i.e., the edge server from which the request was sent) will not be able to know the identity of the other participating edge servers 175 (vouchers) and/or the number of the services provided. In some embodiments, the Cloud API gateway may execute a mapping between these ad hoc IDs and the actual network address of these services.

5. "Anonymous Delivery"—In some embodiments, given the edge servers 175 cannot see each other, there may be a service named Dispatcher service, which may function as a middleman-like service. In some embodiments, this service may take a message from a source edge server 175 and transfers it to a target edge server 175, again to ensure two edge servers 175 cannot communicate directly to protect the identity of the users. In some embodiments, methods of Anonymous Delivery may be implemented, e.g., the Dropbox method, a Tor-inspired protocol, etc. In any event, no data is stored in the network, outside of the relevant edge server 175.

Figure 4:
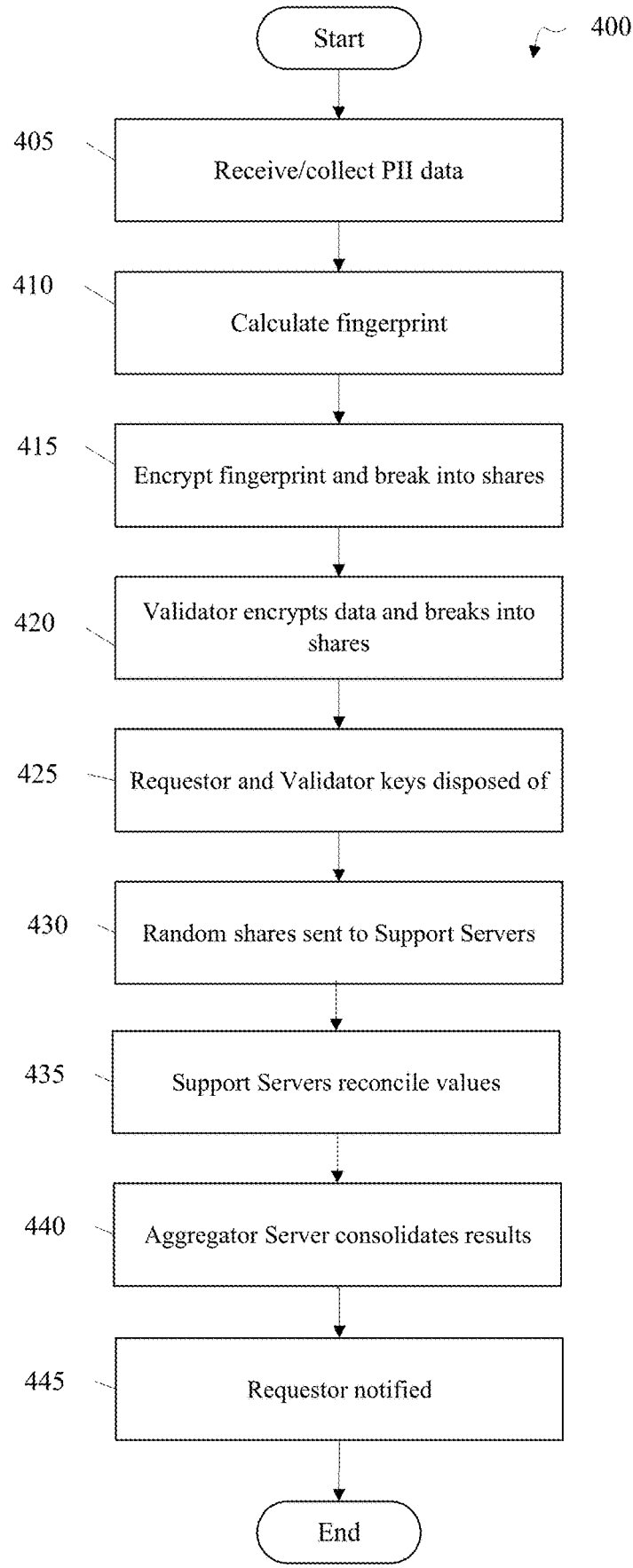
FIG. 4 is a flow diagram of a method 400 for providing anonymous validation of a query among a plurality of nodes in a network, according to at least one embodiment of the invention.

FIG. 4 is a flow diagram of a method 400 for providing anonymous validation of a query among a plurality of nodes in a network, according to at least one embodiment of the invention. In some embodiments, method 400 may be performed on a computer (e.g., system server 110, user device 140 (also referred to herein as customer device or customer backend), and/or edge servers 175) having a processor (e.g., server processor 115), memory (e.g., server memory 125), and one or more code sets (e.g., server module(s) 130) stored in the memory and executing in the processor. The method begins at step 405, when a user (e.g., a service provider such as an online store), hereinafter the "Requestor" or "Requestor node", receives/collects data, e.g., PII from a new customer. A Requestor, as understood herein, is a member of the network (and its respective node/edge server 175) which desires to check whether a data value (e.g., an obtained e-mail address) the member holds exists in the database of any other member of the network.

In some embodiments, at step 410, the Requestor may calculate a fingerprint of the data to be queried and potentially validated (explained in further detail herein). In some embodiments, the query, i.e., fingerprint may be an encoded (e.g., hashed, encrypted, etc.) presentation of the data or other one-way function which represents the data. In some embodiments, the fingerprint may be a fully or partially hashed presentation or a subset or truncated version of the data.

In some embodiments, at step 415, the Requestor may encrypt the fingerprint, e.g., with a one-time encryption key, and break the encrypted fingerprint into multiple random shares, as described herein. It should be noted that in some embodiments, encrypted fingerprints may be broken into multiple predefined shares, or may not be broken into any shares at all.

In some embodiments, at step 420, a plurality of Validators (Vouchers) may encrypt their data with the one-time encryption key, and break their data into multiple random shares. As understood herein, a Validator (or Voucher) is a member of the network (and its respective node/edge server 175) who holds a database or list of values. In various embodiments, the protocol may check whether the "lookup value" that the Requestor requested exists in the list of values held by the Validator. It should be noted that, as with the Requestor, in some embodiments, encrypted Validator data may be broken into multiple predefined shares, or may not be broken into any shares at all. A lookup value, as understood herein, may be the value that the Requestor would like to test whether exists in any list of values held by any other member of the network. In some embodiments, the lookup value may be a single value, or a list of values.

In some embodiments, in addition to or in place of step 420 and/or step 425, the one-time encryption key may only be generated by each Voucher, in which Vouchers encrypt their own data with the one-time encryption key. In such embodiments, the Voucher and Requestor may then execute a "blind encryption" protocol or other oblivious mechanism (e.g., blinded digital signatures, using garbled circuits, etc.) which allows the Requestor to receive an encrypted copy of their own data without exposing their data or the one-time encryption key generated by the Voucher. The Voucher may then delete the generated key before sending any data out. This mechanism ensures that each request is different and prevents anyone other than the Validator from ever deciphering the data sent by the same Validator.

In Some embodiments, at step 425, keys used for both the Requestor and Validator are destroyed or otherwise disposed of, e.g., automatically or manually.

In Some embodiments, at step 430, the Requestor and Validators may send each random share to a special network node called a Support server or Computation server. Each random data share may be sent to a separate Support server. A Support Server, as understood herein, may be a server providing computation assistance to the network. For example, in various embodiments, a support survey may take additional actions to support the network operation, such as transferring data, processing data, collecting metadata, etc. The computation server retains no data of its own and may typically perform predefined computation over the data provided to it.

In Some embodiments, at step 435, each Support server, may reconcile (e.g., subtract, XOR, dividing the numbers, etc.) the value from the Requestor with/from the values received from the Validator.

In Some embodiments, at step 440, all results may be consolidated by an Aggregator. An Aggregator, as understood herein, is a participating member in the network (and its respective node/edge server 175), which may be configured to collect and accumulate the data sent from all vouchers. In some embodiments, the Aggregator may use the data to count the number of times that the lookup value existed in the databases of all vouchers. In some embodiments, the Aggregator may consolidate all the results from the Support servers and look for a match (e.g., sum of all numbers is 0). It should be noted that in some embodiments a match may not be an exact match but rather may be considered a match based on, e.g., a statistical or threshold similarity, etc.

In some embodiments, the protocol implemented may multiply all values calculated in step 430 by a secret random number before sending them to the Aggregator for consolidation. The random number may be generated, e.g., by the Support Servers, a trusted third party, or the Voucher.

In Some embodiments, at step 445, if a match is found, the original Requestor may be notified and the method ends. The originating service provider (the Requestor) may now continue providing the service to the new customer, knowing that the data is valid, or the service provider may take additional steps knowing that the data cannot be validated and may be, e.g., inaccurate or fraudulent.

Various embodiments of the invention as described herein provide significant benefits to privacy and security for both consumers and service providers:

Privacy—No private data ever leaves any member's data warehouse. Each member only has access to data that member explicitly received from its customer.

Anonymity—No one can learn that a certain customer is registered to a specific service.

Decentralized—There is no centralized data store that can be hacked or breached.

Resilience—No dependency on a single provider. Members may join or leave the network with little overall impact.

Holistic—Access to all data validation from all sources and geographies may performed via a single interface.

Real-time—Data validation may be done by businesses that own the relationship with the customer, hence acting as first-party data providers.

Reliability—Reputation of Members is handled within the protocol.

In accordance with various embodiments of the invention, the Requestor, Validators, Support Servers, and Aggregators are described in more detail herein:

Requestor:

A. Role in a Query: The member (and respective node) who is searching to validate a field which is part of an identity (e.g., email, phone number, credit card number, funding instruments, bank account details, biometrics, health data, etc.). Each request includes a key field, which needs to be uniquely defined. (See Table 1 below.)

B. Input: none

C. Output: creates an encoded (e.g., hashed) request (e.g., a Query) that, in some embodiments, may be broken down into multiple shares, e.g., random shares, as well as a request hint. The request hint may be sent to the Validators, while the random data shares may be sent to the Support servers.

D. Limitations: Any node can be a Requestor. If a node is a Requestor, it cannot take any other role in this Query.

E. Cardinality: only one member can be a Requester per Query. Cardinality, as understood herein, is the number of times that a value or property appears in a list or as a set of items. For example, in the list {1, 1, 2, 4, 6, 6, 6, 9} the cardinality of the value 6 is 3, the cardinality of the value 9 is 1.

Validator:

A. Role in a Query: In some embodiments, the Validator may be an owner of data. One of the records that the Validator owns may match the Requestor's query.

B. Input: a request containing a filter with a hint derived from the key field.

C. Output: a set of random shares derived from an encoded (e.g., hashed) subset of the Validator's data. The subset may be defined by the request hint, and may be a match with the requested query.

D. Limitations: The Validator of a transaction cannot take any other role in the computation of a transaction (Requestor, S-Server, Aggregator, network).

E. Cardinality: there can be any number of Validators per transaction

Support Servers (S-Server):

A. Role in a Query: compares the value received from the Requestor and the list of values received from the Validator, and, e.g., reconciles them.

B. Input: a random share of the encoded and encrypted field from the Requestor, and a list of random shares of the encoded and encrypted fields (same field, same encryption key but maybe not be the same person) from the Validator.

C. Output: a list of results comparing the difference between the value of the random shares from each Requestor and Validator.

D. Limitations: can be any entity which does not hold any other role in the computation. In some embodiments, the S-server may be an ephemeral node, and does not require any persistent memory, or storage capacity.

E. Cardinality: the number of S-Server can be set to any value from 2 and up based on the desired resistance level to abuse.

Aggregator:

A. Role in a Query: receive all the results from the S-Servers and determine which Validator or Validators have a match for the relevant requested value. The Aggregator will then communicate the results back to the Requestor, and settle the business transaction.

B. Input: a list of results from all S-Servers.

C. Output: A Yes/No response (or equivalent) to the Requestor, e.g., notifying whether a match to the query was found in the network. In some embodiments, the Aggregator may also be configured to calculate and provide a confidence score. In some embodiments, the response may also include metadata, for example when the identity was first or last seen on the network, etc.

D. Limitation: the Aggregator may be operated by a third party, e.g., a manager, host, or provider of the private peer-to-peer network.

E. Cardinality: there is only one Aggregator per query.

Figure 5:
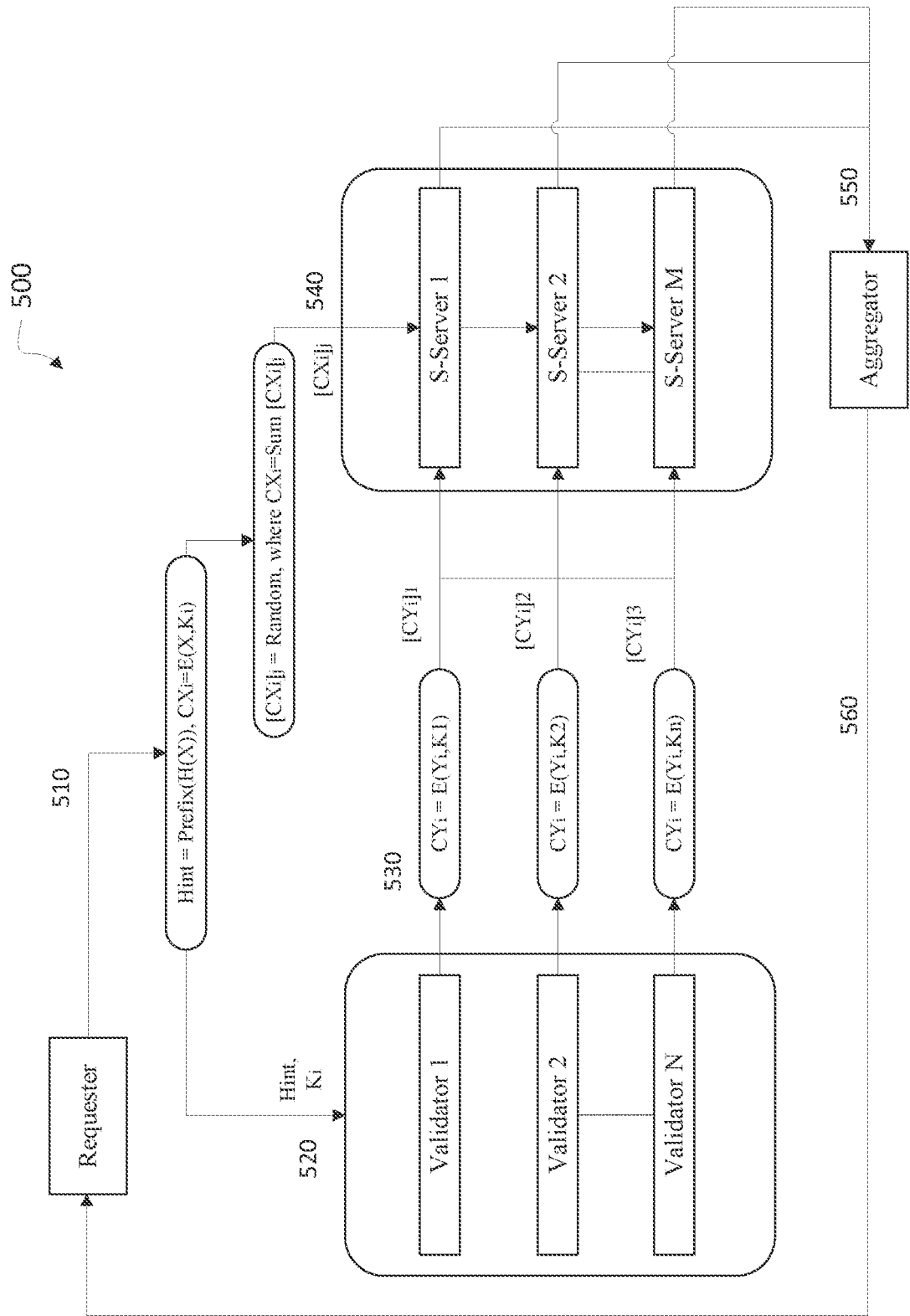
FIG. 5 is a flow diagram of a method 500 for validating an individual data field, according to at least one embodiment of the invention.

FIG. 5 is a flow diagram of a method 500 for validating an individual data field, according to at least one embodiment of the invention. In some embodiments, the method begins at step 510, when a Requestor is configured to hash the data field, e.g., an email address (X) and encrypts it, e.g., with a pre-transaction key (CXi). In some embodiments, a separate key may be generated for each validator—a key is generated for each member (Validator) who assists the Requestor in the Query. Accordingly, for a single request multiple keys may be generated and used. After the data is encrypted, in some embodiments, it may be split into M shares ([CXi]j), e.g., M random shares, for example, such that their sum is equal to the encrypted value.

At step 520, in some embodiments, the Requestor may be configured to use a separate hash function to calculate a short hint from the original email (for example, five (5) bits long). In some embodiments, this hint may be used to filter results by each Validator, and may be selected in a way that ensures that each hint can potentially match 100s of thousands of identities. The Requestor may send to each Validator the hint value, as well as the per-validator secret key.

For example, the hint may be used to reduce the number of records that a Validator needs to process, e.g., by splitting the full database to many smaller ones. This may be done using a short hash function. For example, with a 5-bits hash, the original database is split into 32 smaller ones. In some embodiments, the length of the hint may be selected based on the size of the original database. For example, if the original database had 100 million records, then a hint like the one above will split it into smaller databases, each about 3 million records in size. An example hint may be: hint=Hash(X) mod 30, where Hash is any hash function and mod is the reminder of a division by 30. Of course, in some embodiments no hint may be used, and all records may be processed.

At step 530, in some embodiments, each Validator may be configured to search through its set of records to find the relevant records (Yi) that match the hint value it received from the Requestor. For each matching record, the Validator may calculate a hash of the value(s) in its database, and encrypt it using the secret key (CYi). After encryption, in some embodiments, the Validator may pick M random shares ([CYi]j), such that their sum will be equal to the encrypted value. This operation may be repeated with all records which match the hint (when a hint is implemented). Each random share may be sent to one of the S-Servers to be compared with the random share received from the Requestor. Each S-Server may handle only with a fragment of the data. Accordingly, S-Server 1 may receive the first random share from all Validators, while S-Server m will receive the mth fragment (random share) from all Validators. Note, in some embodiments, both Requestor and Validator keys are deleted immediately after encrypting the data, e.g., automatically or manually. Therefore, the result is completely anonymized and cannot be linked to any PII data.

At step 540, in some embodiments, the S-Server (Support Server or Computation Server) may be configured to calculate the difference between (or otherwise reconcile) the random share received from the Requestor and all random shares received from all Validators. The S-Server may then send the list of differences (or reconciled results) to the Aggregator.

At step 550, in some embodiments, the Aggregator may be configured to add, e.g., all the differences or results received from all S-Servers, e.g., on a per-record basis, and identify any record in which all the values add-up to 0 or are otherwise completely reconciled. In some embodiments, a sum of 0 indicates a match between the value of the Requestor and that of some Validator(s).

Finally, at step 560, in some embodiments, the Aggregator maybe be configured to aggregate the results and sends answers to the Requestor.

Embodiments of the invention fully anonymize the data before it leaves the customer network. Therefore, it does not include any PII data, and does not allow the exposure of any personal data whatsoever. Below in Table 1 is a summary of what each participating party may "learn" as part of the computation:

TABLE 1

| Component | Exposed to | What can be learned about a PII field? |
|---|---|---|
| Requester | Match score | Which fields were validated by the network and the score of the validating members. No new data is learned. |
| Validator | A hint, matching 100s of thousands of potential records | No person can be singled out, no inference can be made about them, and no PII data is learned. |
| S-Server | A series of random numbers | All numbers are random and contain no information. Even if all but 1 S-server collaborate they still learn nothing. |
| Aggregator | Random numbers, and whether two records matched | Whether a match exists, but don't know who the match is about. Aggregator cannot single out, or link data across validators, as each uses its own one-time key. |
| Directory and Reputation | Only set the members and from time to time maintain the integrity of the system | Nothing |

In order to validate an identity, a company may want to receive validation for as many properties relating to the entity as possible. Embodiments of the invention use a process similar to the one described above to compare all the properties relating to a single query, and produce a single record indicating which of the values collected at the time of sign-up are indeed valid, Moreover embodiments of the invention specify whether the values relate to the same entity and the confidence level associated with it.

TABLE 2

Fields for Validation:

| Fields | Key Field | Matching Logic |
|---|---|---|
| Email | Yes | Normalization + Full encoding (e.g., full hashing) |
| Phone number | Yes | Normalization + Full encoding (e.g., full hashing) |
| Credit card number (first 6 and last 4) | | Full encoding (e.g., full hashing) |
| Full name | | Fuzzy match for first name, middle name and last name separately |
| Address | | Country, city, state normalized and encoded (e.g., hashed). Street fuzzy match Postcode-normalized and encoded (e.g., hashed) House and apt-normalized and encoded (e.g., hashed) |
| Shipping address | | Same as address |
| IP | | Normalization + Full encoding (e.g., full hashing) |
| ID number/SSN | Yes | Normalization + Full encoding (e.g., full hashing) |
| Passport number | Yes | Normalization + Full encoding (e.g., full hashing) |
| Birthday date | | Normalization + Full encoding (e.g., full hashing) |
| Bank account number | | Normalization + Full encoding (e.g., full hashing) |

TABLE 2-continued

Fields for Validation:

| Fields | Key Field | Matching Logic |
|---|---|---|
| Location (gps/ip) | | Normalization + Full encoding (e.g., full hashing) |
| Device profile | | Normalization + Full encoding (e.g., full hashing) |
| Zip code | | Normalization + Full encoding (e.g., full hashing) |

In some embodiments, Validators may provide additional non-PII metadata per record such as first login time, last login time, number of visits, fraud related reputation, asset age, etc.

In some embodiments, a history of data points may be provided. For example, if an email address has been stored in a user's system for more than a year, and the customer has been recorded using a specific device 2 years ago, and/or a credit card was detected 6 months ago, etc. Such data may be formulated according to embodiments of the invention, in a customer data history.

Some embodiments of the invention may provide fraud reputation regarding one or more of the data points, for example when a fraud-related chargeback from a particular credit card has been detected in the last week, the credit card and other related data points may be flagged as suspicious.

In some embodiments, when an Aggregator is able to identify that a key field has matched the query field, the Aggregator may help with providing validation for the entire record. For example, if a Validator is able to validate an email and IP address, but is not able to validate the credit card number and the address, which were the requested fields, knowledge that the Validator does not have these field in their database may also be of value in overall validation of the entire record.

As described herein, embodiments of the invention rely on one or more protocols which may operate over a network of members, each holding a private list of values. In some embodiments protocol implementation allows a member of the network to act as a Requestor and request to receive a verification whether a specific lookup value exists within the private list held by any other member of the network. Such other members will serve as Vouchers (as described herein).

In some embodiments, the Requestor is able to lookup value x in the network, as well as calculate the cardinality of the value, while maintaining the following privacy features:
1. No one (other than the requesting party) learns the value of x
2. The requestor does not learn which member(s) of the network hold the value x
3. None of the members, learn whether the value x exists in their private database For simplicity of description, the requesting member is referred to as the Requestor, and each other party Voucher or Validator. For a network of n+1 members the members are marked as $V^p$, Requestor will be generating a lookup query for the value x, and each Voucher may hold a private list of values $Y^p = \{y^p_i\}$.

The following notation is used in the descriptions below:

H(x)—a one-way function. Typically refers to a Hash function or other one-way function. Given a value y=H(x) it is computationally hard to find any value x' such that H(x')=y=H(x)

H(x, rand)—a randomized one-way function, where the value x is hashed or otherwise encoded in combination with a random value. For each choice of rand the result of the function will be different. As with regular one-way functions, it is computationally hard to find a value x' such that H(x', r)=y=H(x, r) all choices of x and r x—the lookup value $Y = \{y_i\}$—is a set or list of values. The whole set is referred to as Y and individual values in the set are referred to as $y_i$, where the subscript indicates an index of the value of the list. For example $y_1$ will represent the first value in the list.

c=Enc(m, K) is an encryption function with a key K. The function transforms any plain message m to an encrypted cypher c such that it is computationally hard to find m without knowledge of the secret key K.

m=Dec(c, SK) is a decryption function with a secret key SK. The function is able to take an encrypted cypher c and convert it back to the plain message by using the knowledge of the secret key SK Given an Encryption function E(m, K), E is said to be a Commutative Encryption Function, if for any message m and any pair of keys $K_1$ and $K_2$ the same result is found whenever the message is encrypted twice, once with each key, regardless of the order in which the keys are used. That is, $E(E(m, K_1), K_2) = E(E(m, K_2), K_1)$ Superscripts—superscripts indicate the different members on the computation, or the values related to them. For example if there are multiple Vouchers participating in a computation, the database relating to the first server is indicated as $Y^1$ and the database relating to the second member to $Y^2$. Similarly, if a secret key is chosen for each member, this key will be notated as $SK^p$ for member p.

Splitting values—some methods described below take a single value and split it into multiple "sub-values", which may be recombined to construct the original value. For example the three digits number 469 may be split into the digits 4, 6, and 9. Such a split of value v is denoted with square brackets $[v]_1, [v]_2, [v]_3, \ldots$. In the example above, $[469]_1$ will be 4, $[469]_2$ will be 6, and $[469]_3$ will be 9. Different solutions may use different methods for split and recombining values into sub-values.

Protocol 1

In some embodiments, the service of additional Computation Servers is used which does not hold data, called Comp 1. Requester uses a one-way hash function or other encoding to calculate $H_0 = H(x)$
2. Each Voucher $V^p$ calculates the set of values $H^p_i = H(y^p_i)$
3. Requester sends $H_0$ to Comp
4. Each $V^p$ sends his data to Comp
5. Comp compares $H_0$ to all the values received from each $V^p$ looking for a match
6. Comp reports back to Requester the number of matches found Replay Protection In some cases, the same value x may be searched for multiple times. To prevent anyone from learning that the same value is being searched, in some embodiments, a random element may be integrated into the query. The value may be added in such a way that an eavesdropper cannot distinguish whether two requests come from two separate lookup values $x_1$ and $x_2$ requesting the same value x twice.

Protocol 1.1

In some embodiments, a variation to Protocol 1 may be implemented in which the Requestor and Vouchers use a random one-way function to obfuscate the original value of x. The function, and its parameters are known to both the Voucher and the Requestor. By way of example, a randomized hash function, an encryption function, or a function selected randomly from a known set of functions, may be used.

In the below description a random one-way function is used instead of a known hash function.
1. Requestor selects a random secret nonce
2. Requestor uses a randomized one-way hash function or other encoding to calculate $H_0 = H(x, nonce)$
3. Requestor sends the value of nonce to each Voucher $V^p$
4. Each member $V^p$ calculates the set of values $H^p_i = H(y^p_i, nonce)$
5. Requester sends $H_0$ to Comp
6. Each $V^p$ sends his data to Comp
7. Comp compares $H_0$ to all the values received from each $Bob^p$ looking for a match
8. Comp reports back to Requester the number of matches found Linkability Protection In order to preserve secrecy between the different Vouchers, and to prevent Linkability, as required by privacy regulations, in some embodiments, the values generated by each Voucher are ensured to be different, and cannot be compared to values generated by other Vouchers. This way eavesdroppers or curious parties are prevented from learning whether two or more Vouchers hold the same original value in their original lists, even if the actual original value remains unknown.

To implement this, in some embodiments, a separate random secret is generated between the Requestor and any of the Vouchers, which will be known only to them. In various embodiments, this value may be generated by the Requestor itself, jointly by the Requestor and the Voucher, by the Voucher, by a third party, or any combination of parties thereof.

In some embodiments, the secret value may be used as input to any mapping function that is used by both the Requestor and the Voucher prior to performing the lookup protocol. By way of example, this function may be a one-way randomized hash, an encryption function, or a function selected randomly from a known set.

Protocol 1.2

Protocol 1, where a Linkability protection is added by the use of a randomized hash function. The Requester selects a different nonce value for each member $V^p$
1. Requester selects a set of random secrets $nonce^p$
2. Requestor uses a one-way hash function or other encoding to calculate $H^p_0 = H(x, nonce^p)$
3. Requester sends the value of $nonce^p$ to each member $Bob^p$
4. Each Voucher $V^p$ calculates the set of values $H^p_i = H(y^p_i, nonce^p)$
5. Requester sends the set $H^p_0$ to Comp
6. Each $V^p$ sends his data to Comp
7. Comp compares $H^p_0$ to all the values received from each $V^p$ looking for a match
8. Comp reports back to Requester the number of matches found Protocol 1.3

The method of protocol 1.1 where the secret value of nonce is generated using a key-agreement method involving one or more of the other parties $Bob^p$ Protocol 1.4

The method of protocol 1.2, where the secret value of $nonce^p$ is generated by requestor and voucher using a key-exchange mechanism (e.g. Diffie Hellman)
1. requestor and voucher agree on key-exchange protocol parameters
2. requestor and voucher perform secret key exchange, generating a shared secret s
3. requestor and voucher uses a key derivation mechanism to calculate $K^p$ from the secret s
4. Continue with the steps of protocol 1.2 using $K^p$ instead of the $nonce^p$ value Variation 1

The methods of all protocols above, where the random one-way function is replaced with a symmetric-key encryption system using a random shared key, or a key generated using a key-exchange protocol as specified above.

Variation 2

The methods of all protocols above, where the random one-way function is replaced with a public-key encryption system using a random shared key, or a key generated using a key-exchange protocol as specified above.

Variation 3

The methods of all protocols above, where the random one-way function is replaced with a randomly selected mapping function.

Protocol 2

In this family of protocols, a commutative encryption function is used to secretly compare values, without exposing the value themselves. By way of example, El-Gamal or Pohlig-Hellman encryption schemes may be used.
1. Let E(m, K) be a commutative encryption system (using private or public key) that meets the commutative property specified above.
2. Requester selects a secret key $K_0$
3. Requester encrypts the lookup value x with $K_0$ using E, receiving $E_0 = E(x, K_0)$
4. Requester sends $E_0$ to all members $Bob^p$ in the network
5. All Vouchers $V^p$ select a secret key $K_p$
6. Each Voucher uses his secret key to encrypt its local database $Y^p$ generating $$E^p_i = E(y^p_i, Kp)$$

7. In addition, each Voucher will encrypt the received $E_0$ with his key to generate the double-encrypted key, $E_{0p} = E(E_0, K_p)$
8. All Vouchers $V^p$ will send their encrypted database $Y^p$, along with the double-encrypted
key, $E_{op}$ back to requester
9. Requester will use his secret key to double-encrypt all values received from each
Voucher $V^p$ generating the double-encrypted database $$E^{p0}_{i\ 0} = E(E^p_i, E)$$

10. Requester can now compare for each p the value of E0p with the values of $E^{p0}$. Counting the total number of matches found.

Alternative 2.1

Use the same process as in protocol 2 above, with the following alternative at step 9:
9. requester uses her key to decrypt the values of $E_{0p}$ and receive $$Ep = D(E_{0p}, K_0) = D(E(E(x, K_0), K_p), K_0) = D(E(x, K_p), K_0), K_0) = E(x, K_p)$$

10. For each p requester compares the value of $E_p$ with all values $y^p$ counting the total number of matches found.

Alternative 2.2

The same protocol as Protocol 2.1 above, but with the introduction of a third computation member, Comp Starting from step 8 above:

8. All Vouchers V P will send their encrypted database $Y^p$ to Comp

9. All Vouchers V P will send the double-encrypted key, $E_{op}$ back to requester 10. requester uses her key to Decrypt the values of $E_{Op}$ and receive $$Ep=D(E_{Op},K_0)=D(E(E(x,K_0),K_p),K_0)=D(E(x,K_p),K_0),$$
$$K_0)=E(x,K_p)$$

11. Requester send all keys $E_p$ to Comp

12. Comp will compare for each p the value of $E_p$ with all values $y^p$ counting the total number of matches found, and send the sum back to requester Efficiency Enhancement All the above-mentioned protocols require that the Vouchers scan their full list of values, perform computation on each value, and send it to other parties. Therefore, the complexity and time required to complete the protocol grows linearly with the size of the lists held by each member.

To reduce this complexity, in some embodiments, mapping may be implemented which maps any value that the Requestor or Voucher may have in their list to a different value, coming from a smaller range. Using this mapping, each list held by a Voucher may be split into multiple sub-list of smaller size. By way of example, all values may be split into even and odd numbers, having two lists of about half the size of the original one.

In some embodiments, at the beginning of the protocol, the Requestor may calculate the mapping of the lookup value x and send it to the Voucher as a hint. The Voucher may use this value to identify which of the sub-lists he holds should be used for the computation.

In some embodiments, an efficiency parameter λ may be implemented which defines the number of sub-lists that are generated from each original list. For example, it may be chosen to split each list to 10 sub-lists each roughly a tenth of the size of the original list.

In some embodiments, the system may select the efficiency parameter value from time-to-time to balance between privacy and efficiency. This selection may depend on the number of Vouchers, the number of values that each Voucher hold in their list, the size of the population, regulatory requirements, and more.

By way of example a one-way hash function may be used, and a modulu λ to split all values into sub-lists using the mapping group=H(y) mod λ.

Protocol 3

1. Requester calculates group=H(x) mod λ
2. Requester sends group to all Vouchers $V^p$
3. Each Voucher calculate $group_i$=H($y_i$) mod λ for all values of $y_i$ in their list, and discards values where $group_i \ne$ group
4. Continue with any protocol on the smaller list of values instead of $Y^p$ as described above.

Efficiency Pre-Calculation

In some embodiments, splitting into groups using a mapping function may be done on-the-fly as described above, or pre-calculated by the Voucher ahead of time. In this case the Voucher may compute the group that each value in its list belongs to, and save the result.

Moreover, in some embodiments, the Voucher may split the values into multiple lists, each containing all the values from the original list that belong to the same group.

Splitting and Reconstructing Values

To further protect the secrecy of a value v, in some embodiments it may be split it into K parts, such that each part $[v]_j$ will include very little, or no information about the original value v. A splitting method needs to be reversible, so it will be possible to calculate the original value of v from the list of parts.

In some embodiments, the secrecy of a split may be measured by measuring the amount of information about v that may be revealed by knowing one piece of the split $[v]_j$. In some embodiments, a split may be considered ideal if an adversary can gain no information about the original value of v unless they have all the parts $[v]j$ available to them. In some embodiments, a split n is considered private if n<K parts are needed to reconstruct v, but cannot obtain information about v with n or less parts.

One example of an Ideal Split and reconstruction, can be done by selecting a large modulo N and K random values such that $$\sum_{j=1}^{K|} [v]_j = v--$$

it can be shown that any partial sum of less than K parts is evenly distributed and therefore reveals no information about v.

Another alternative is to select a set of evenly distributed values such that $\oplus [v]_j = v$. Another alternative is to split the binary representation of v into individual bits.

Protocol According to Embodiments of the Invention:

The protocol may include one or more of the following elements to achieve the maximum amount of privacy and secrecy:

A new set of secrets is used in every request.
A separate secret is used between the Requester and every Voucher.
The Requester and Voucher use one-way functions to map all their data using the shared secret.
Each data point is split with an Ideal Splitting method.
Splits are processed by compute servers, to compare each part of the split individually.
The results of the comparison (which have no residual data) are collected and processed by an Aggregator.
The Aggregator will send the result back to the Requester only.

In this protocol, K Compute Servers and an Aggregator are used. The number of Compute Servers may be selected as a security parameter of the protocol.

1. Requester would like to lookup the value x
2. Requester performs a key exchange protocol with each Voucher in the network, generating a series of secret keys $SK^p$
3. Requester calculates a hint group=H(x) mod λ
4. Requester sends the value of group to each Voucher $V^p$
5. Requester encrypts the value of x using the all the secret keys generated in step 2, $SK^p$ to generate the hidden value $\bar{x}^p = E(x, SK^p)$. Requester may delete $SK^p$ after using it
6. Requester splits each of the hidden $\bar{x}^p$ values into k random parts $[x^p]_j$, drawn from an even distribution such that $$\sum_{j=1}^{k} [\bar{x}^p]_j = x^{-p}$$

7. Requester sends the splits to k different Compute Servers, where the first compute server only receives the first split of all hidden lookup values $\{[\bar{x}^1]_1, [\bar{x}^2]_1, \ldots, [\bar{x}^p]_1\}$, The second Comp receives the second split $\{[\bar{x}^1]_2, [\bar{x}^2]_2, \ldots, [\bar{x}^p]_2\}$, 8. Each Voucher selects only the values $y^p_i$ from his list $Y^p$ where group=$H(y^p_i)$ mod $\lambda$ 9. Each Voucher will encrypt each value $\bar{y}^p_i$ using the secret key created at step 2, to generate the series of hidden values $\bar{y}^p_i = E(y^p, SK^p)$. Voucher may delete $SK^p$ using it 10. For each such $\bar{y}^p_i$ the Voucher splits the hidden value into k parts $[\bar{y}^p_i]_j$ by selecting values from an even random distribution, such that $$\bar{y}^p_i = \sum_{j=1}^{k} \left[\bar{y}^p_i\right]_j$$

11. Each Voucher sends the list of parts to k different Compute Servers, where the first Compute Server receives the first part of each hidden value $\{[\bar{y}^p_i]_1\}$, the second Compute Server receives the second part $\{[\bar{y}^p_i]_2\}$, and so forth 12. Each Compute Server will receive from the Requester one part of a hidden-value for each of the Vouchers $([\bar{x}^p]_j)$ 13. Each Compute Server will receive a list of values from each Voucher $\{[\bar{y}^p_i]_j\}$ 14. Compute Server j will subtract the values received from the Requester, from the list of values received from the respective Voucher, generating the new list of values $\{[\bar{y}^p_1]_j - [\bar{x}^p]_j, [\bar{y}^p_2]_j - [\bar{x}^p]_j, \ldots, [\bar{y}^p_i]_j - [\bar{x}^p]_j, \ldots\}$ 15. Compute Server j will send the list of differences to the Aggregator 16. The Aggregator, will receive a list of values from each Compute Server, and add them together yielding the list of sums $$\left\{\sum_{j=1}^{k} \left[\bar{y}^p_i\right]_j - [\bar{y}^p]_j\right\}.$$

17. The Aggregator will count the number of times that the sum calculated in step 16 equals zero. Each such sum indicates a match of the lookup value x to a value held in one of the lists of the Vouchers.

18. The Aggregator will send back to the Requester the number of matches found.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method for providing anonymous validation of a query among a plurality of nodes in a network, the method comprising:
    receiving at a first server a query from a requester node in the network, for validation of the query by at least one other node of the plurality of nodes;
        wherein the query comprises an encoded representation of at least one hidden data point of information of the requester node; and
        wherein the encoded representation is divided into a first set of multiple shares;
    receiving at the first server, from at least one validator node of the plurality of nodes, an encoded representation of at least one hidden data point of information of the validator node;
        wherein the encoded representation from the at least one validator node is divided into a second set of multiple shares, wherein the encoded representations each comprise a one-time encryption and wherein the one-time encryption is used by the requestor node and the at least one validator node;
    comparing by a plurality of support servers the first set of multiple shares from the requestor node with the second set of multiple shares of the at least one validator node;
    determining by a second server, based on the comparison, whether or not the at least one hidden data point of information of the requester node matches the at least one hidden data point of information of the at least one validator node; and
    outputting a no residual match result to the requestor node.

2. The method of claim 1, wherein the first and second sets of multiple shares are randomly generated for each node respectively.

3. The method of claim 1, wherein, the comparing step further comprises:
    sending each share of the first set of multiple shares to a separate support server from the other shares of its set;
    sending each share of the second set of multiple shares to a separate support server from the other shares of its set; and
    at each support server, reconciling a value received from the requester node against an equivalent value received from the at least one validator node.

4. The method of claim 3, wherein, the determining step further comprises:
    aggregating, by the second server, a set of resulting values from each of the plurality of support servers;
    consolidating the sets of resulting values from the plurality of support servers; and
    identifying, based on the consolidating, whether or not a sum equaling zero results.

5. The method of claim 1, wherein the at least one data point field relates to an identity of a customer.

6. The method of claim 1, wherein the network is a closed network, and wherein each node in the closed network is a preapproved member of the closed network.

7. The method of claim 1, wherein each of the plurality of support servers comprises an ephemeral node and wherein the ephemeral node includes no persistent memory or storage capacity.

8. The method of claim 1, further comprising:
calculating, by the second server, a confidence score associated and with the match result; and
outputting the confidence score with the match result.

9. A method for providing anonymous validation of a query among a plurality of nodes in a network, the method comprising:
receiving at a support node in the network a query from a requester node in the network;
wherein the query comprises a one-way function representation of at least one hidden data point of information of the requester node;
wherein the one-way function representation is divided into a first set of multiple shares;
receiving at the support server, from at least one validator node of the plurality of nodes, a one-way function representation of at least one hidden data point of information of the validator node;
comparing by the support server the query from the requestor node with the one-way function representation of the at least one hidden data point of information of the at least one validator node;
determining by an aggregator server, based on the comparison, whether or not the at least hidden one data point of information of the requester node matches the at least one hidden data point of information of the at least one validator node; and
outputting a no residual match result to the requestor node.

10. A system for providing anonymous validation of a query among a plurality of nodes in a network, the system comprising:
a server having a processor and memory, and one or more code sets stored in the memory and configured to execute in the processor, and which, when executed, configure the processor to:
receive at a first server a query from a requester node in the network, for validation of the query by at least one other node of the plurality of nodes;
wherein the query comprises an encoded representation of at least one hidden data point of information of the requester node; and
wherein the encoded representation is divided into a first set of multiple shares;
receive at the first server, from at least one validator node of the plurality of nodes, an encoded representation of at least one hidden data point of information of the validator node;
wherein the encoded representation from the at least one validator node is divided into a second set of multiple shares, and wherein the encoded representations each comprise a one-time encryption and wherein the one-time encryption is used by the requestor node and the at least one validator node;
compare by a plurality of support servers the first set of multiple shares from the requestor node with the second set of multiple shares of the at least one validator node;
determine by a second server, based on the comparison, whether or not the at least one hidden data point of information of the requester node matches the at least one hidden data point of information of the at least one validator node; and
output a no residual match result to the requestor node.

11. The system of claim 10, wherein the first and second sets of multiple shares are randomly generated for each node respectively.

12. The system of claim 10, wherein, the comparing step further comprises:
sending each share of the first set of multiple shares to a separate support server from the other shares of its set;
sending each share of the second set of multiple shares to a separate support server from the other shares of its set; and
at each support server, reconciling a value received from the requester node against an equivalent value received from the at least one validator node.

13. The system of claim 12, wherein, the determining step further comprises:
aggregating, by the second server, a set of resulting values from each of the plurality of support servers;
consolidating the sets of resulting values from the plurality of support servers; and
identifying, based on the consolidating, whether or not a sum equaling zero results.

14. The system of claim 10, wherein the at least one data field relates to an identity of a customer.

15. The system of claim 10, wherein the network is a closed network, and wherein each node in the closed network is a preapproved member of the closed network.

16. The system of claim 10, wherein each of the plurality of support servers comprises an ephemeral node and wherein the ephemeral node includes no persistent memory or storage capacity.

17. The system of claim 10, further configured to:
calculate, by the second server, a confidence score associated and with the match result; and
output the confidence score with the match result.

18. A system for providing anonymous validation of a query among a plurality of nodes in a network, the system comprising:
a server having a processor and memory, and one or more code sets stored in the memory and configured to execute in the processor, and which, when executed, configure the processor to:
receive at a support node in the network a query from a requester node in the network;
wherein the query comprises a one-way function representation of at least one hidden data point of information of the requester node;
receive at the support server, from at least one validator node of the plurality of nodes, a one-way function representation of at least one hidden data point of information of the validator node wherein the one-way function representations each comprise a one-time encryption and wherein the one-time encryption is used by the requestor node and the at least one validator node;
compare by the support server the query from the requestor node with the one-way function representation of the at least one hidden data point of information of the at least one validator node;
determine by an aggregator server, based on the comparison, whether or not the at least one hidden data point of information of the requester node matches the at least one hidden data point of information of the at least one validator node; and
output a no residual match result to the requestor node.

19. The method of claim 9, wherein the set of multiple shares is randomly generated.

20. The method of claim 9, wherein comparing comprises:
- sending each share of the set of multiple shares to a separate support server from that of the other shares of its set;
- at each support server, reconciling a value received from the requester node against an equivalent value received from the at least one validator node.

21. The method of claim 9, wherein the at least one data point relates to an identity of a customer.

22. The method of claim 9, wherein the network is a closed network, and wherein each node in the closed network is a preapproved member of the closed network.

23. The method of claim 9, wherein the support server comprises an ephemeral node and wherein the ephemeral node includes no persistent memory or storage capacity.

24. The method of claim 9, further comprising:
- calculating, by the aggregator server, a confidence score associated and with the match result; and
- outputting the confidence score with the match result.

\* \* \* \* \*